United States Patent [19]

Miyawaki

[11] Patent Number: 4,680,711
[45] Date of Patent: Jul. 14, 1987

[54] CONTROL SYSTEM FOR AN INFINITELY VARIABLE TRANSMISSION

[75] Inventor: Motohisa Miyawaki, Chofu, Japan

[73] Assignees: Fuji Jukogyo Kabushiki Kaisha, Tokyo, Japan; Van Doorne's Transmissie B. V., RA Tilburg, Netherlands

[21] Appl. No.: 695,977

[22] Filed: Jan. 29, 1985

[30] Foreign Application Priority Data

Feb. 1, 1984 [JP] Japan .................. 59-17296

[51] Int. Cl.⁴ .............. B60K 41/22; F02D 29/02; F16D 27/16
[52] U.S. Cl. .................. 364/424.1; 123/198 DB; 192/0.076; 364/431.09
[58] Field of Search ............ 364/424.1, 431.09; 123/198 DB; 192/0.052, 0.076

[56] References Cited

U.S. PATENT DOCUMENTS

| | | | |
|---|---|---|---|
| 4,371,050 | 2/1983 | Ikeura | 123/198 DB |
| 4,377,137 | 3/1983 | Amano et al. | 123/198 DB X |
| 4,421,082 | 12/1983 | Katayose et al. | 123/198 DB X |
| 4,449,495 | 5/1984 | Fiala | 123/198 DB |
| 4,461,374 | 7/1984 | Umezawa | 192/0.052 X |

FOREIGN PATENT DOCUMENTS 2945304 5/1981 Fed. Rep. of Germany ............ 364/431.09
57-131842 8/1982 Japan .

Primary Examiner—Felix D. Gruber
Attorney, Agent, or Firm—Martin A. Farber

[57] ABSTRACT

A system for controlling an infinitely variable transmission is provided with a vehicle speed sensor for sensing vehicle speed and for producing a signal when the vehicle speed exceeds a predetermined value, a neutral range sensor of the transmission, a drive range sensor, and an accelerator pedal release sensor. The system further has an actuator for cutting off fuel. When the vehicle coasts under conditions of the drive range, accelerator pedal release, and at a higher vehicle speed than the predetermined value, fuel is cut off. When the neutral range is selected under the fuel cut off state, the clutch is engaged with a delay.

5 Claims, 6 Drawing Figures

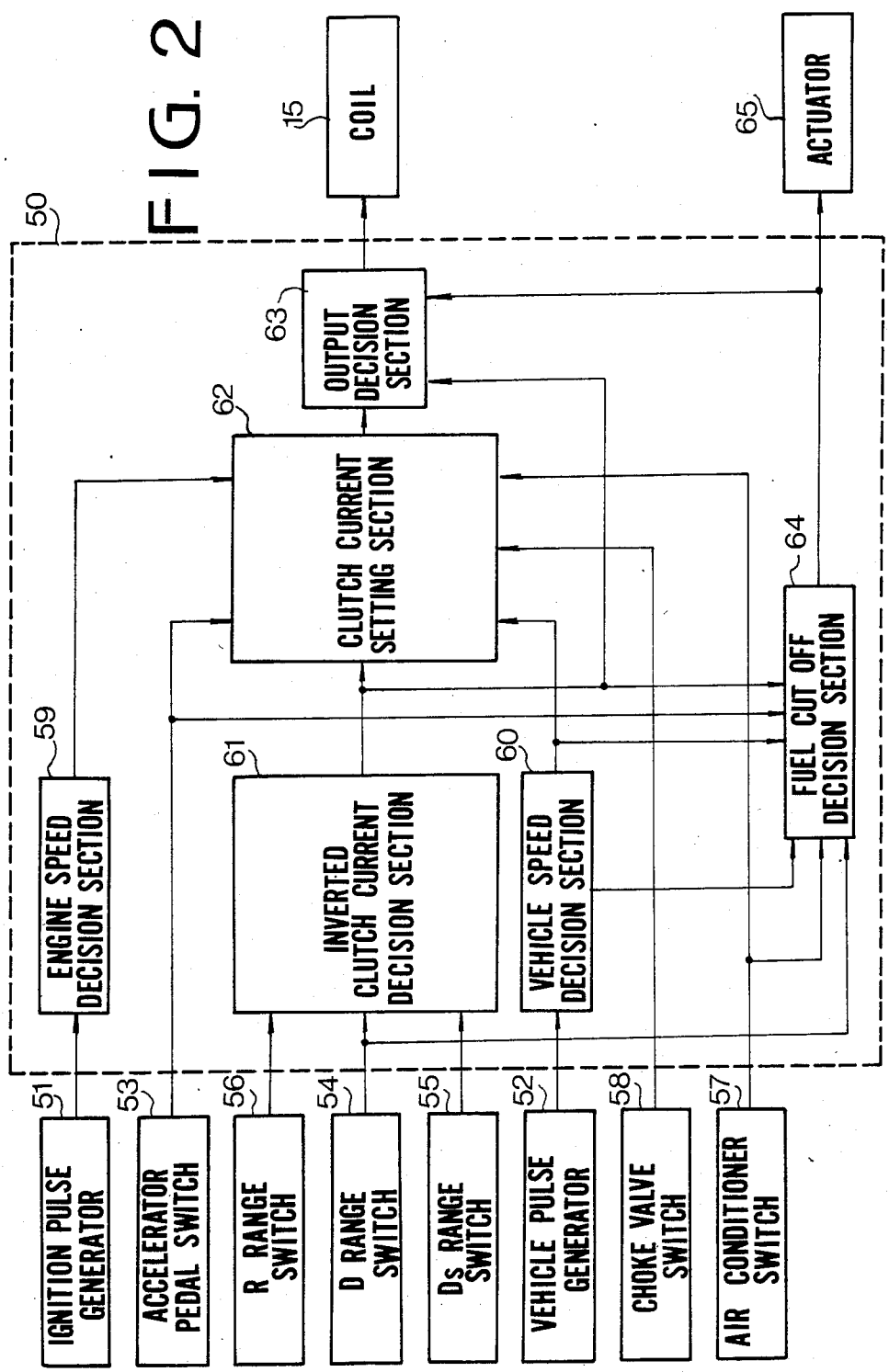

CONTROL SYSTEM FOR AN INFINITELY VARIABLE TRANSMISSION

BACKGROUND OF THE INVENTION

The present invention relates to a control system for an infinitely variable transmission, and more particularly relates to an infinitely variable belt-drive transmission with an electromagnetic clutch for transmitting power of an automotive engine to driving wheels of a vehicle.

For the purpose of improving the fuel consumption of the automotive engine, a fuel control system for cutting off fuel during coasting of a vehicle is disclosed in Japanese patent laid open No. 57-131842. The system is such that when an accelerator pedal is not depressed at high vehicle speed higher than a predetermined value, fuel is cut off, and when the accelerator pedal is depressed or the speed decreases below the predetermined value, fuel is supplied, thereby re-starting the engine.

On the other hand, an infinitely variable belt-drive transmission connected to a crankshaft of an engine through an electromagnetic clutch is proposed by applicant. The transmission is provided with a selector device for changing the transmission to forward drive state (D range), reverse drive state (R range) or neutral state (N range). When the N range is selected, clutch current is cut off to disengage the electromagnetic clutch.

In an infinitely variable transmission provided with the above-described fuel cut off system, the system must be so arranged that when the N range is selected from the D range under the fuel cut off state, fuel is supplied to re-start the engine. During the D range driving under the fuel cut off state, the engine is driven by wheels of the coasting vehicle through the transmission system and electromagnetic clutch. In such a condition, when the N range is selected and the electromagnetic clutch is disengaged, engine speed rapidly decreases, because of a small inertial mass of a drive member of the clutch which is connected to the crankshaft of the engine. If the supply of the fuel is delayed upon the selection of the N range, the engine can not be started due to very low engine speed. The belt-drive transmission is provided with pressure oil servo devices for shifting movable conical discs of drive and driven pulleys to keep the belt at proper positions on the pulleys. When the engine stalls, an oil pump for supplying the pressure oil stops, resulting in a decrease of the pressure of the pressure oil. Accordingly, the movable conical discs fail to hold the belt, so that the belt slips on the pulleys, which will cause breakdown of the transmission.

SUMMARY OF THE INVENTION

The object of the present invention is to provide a control system for an infinitely variable transmission which removes the above-described disadvantages at the selection of the N range from the D range under the fuel cut off state.

To this end, the system of the present invention is characterized in that the disengagement of the electromagnetic clutch is delayed when the N range is selected, thereby preventing stalling of the engine.

The other objects and features of this invention will become understood from the following description with reference to the accompanying drawings.

BRIEF DESCRIPTION OF DRAWINGS

FIG. 2 is a diagram of a control system showing an embodiment of the present invention.

DETAILED DESCRIPTION OF THE PREFERRED EMBODIMENT

Figure 1A:
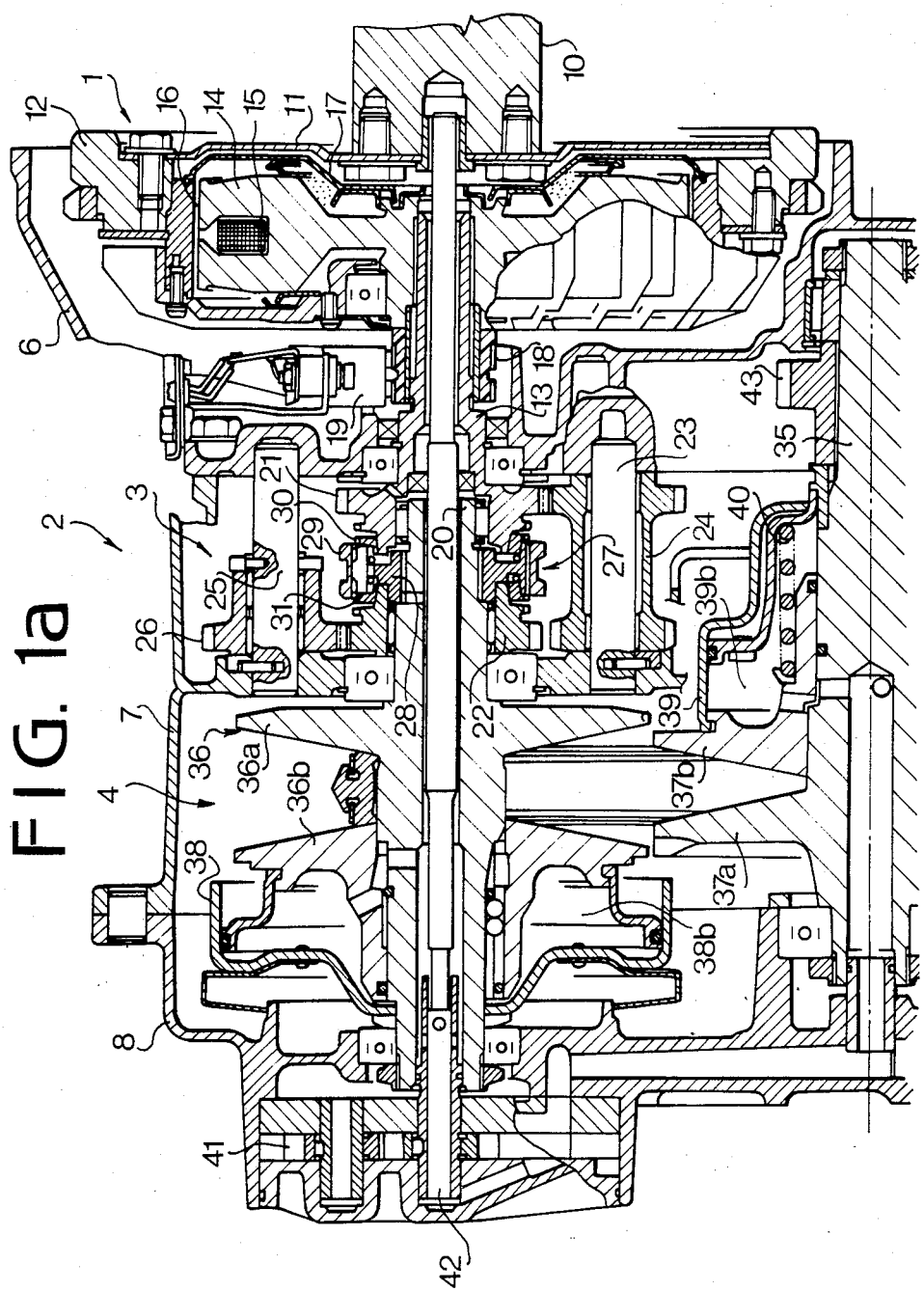
FIGS. 1a and 1b are sectional views of an infinitely variable belt-drive transmission to which the present invention is applied.
Figure 1B:
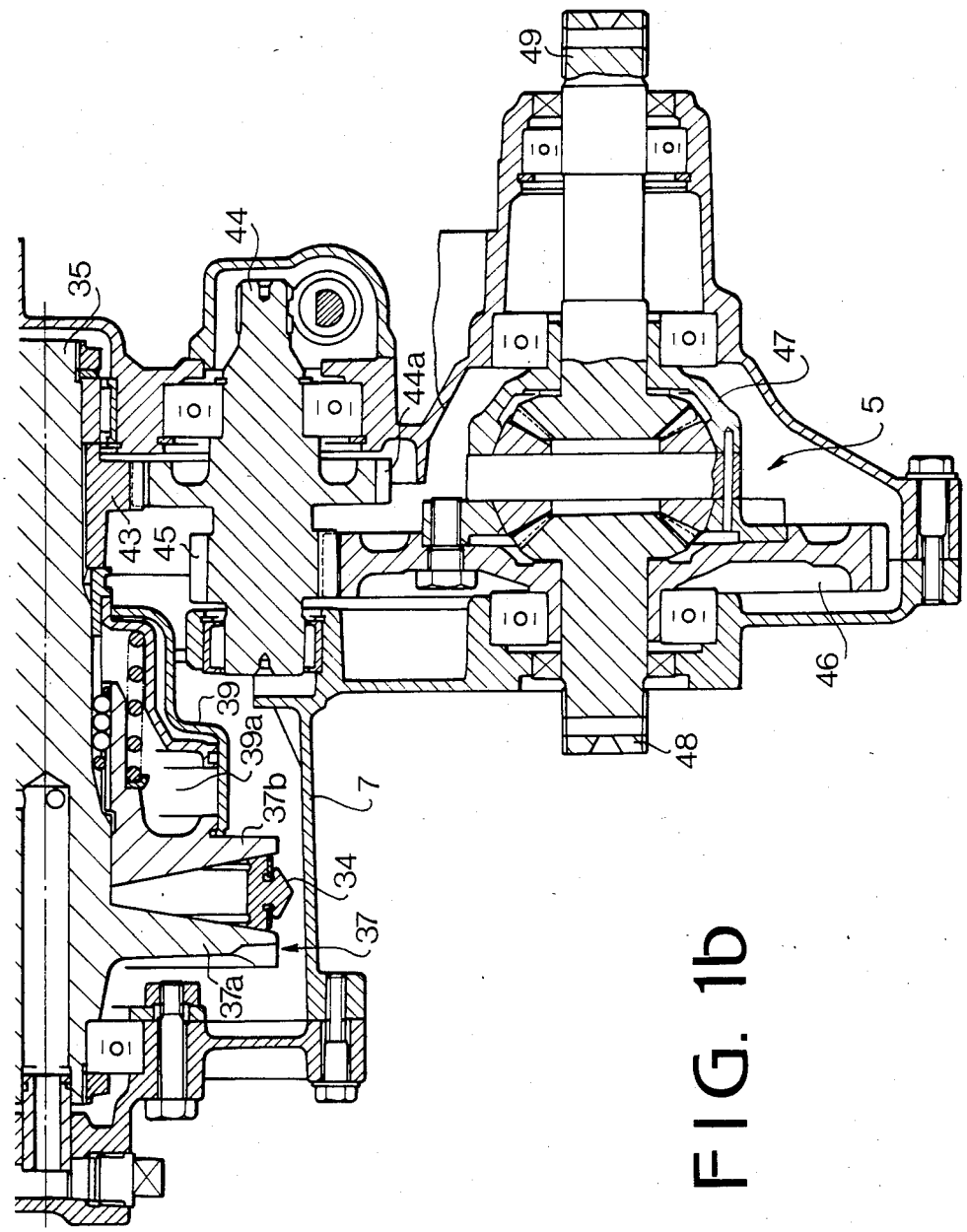

Referring to FIG. 1, an infinitely variable belt-drive automatic transmission for a vehicle, to which the present invention is applied, comprises an electromagnetic powder clutch 1, an infinitely variable belt-drive transmission 2, a selector device 3, pulleys and belt device 4, final reduction device 5, and pressure oil control circuit (not shown). The electromagnetic powder clutch 1 is provided in a housing 6, and the selector device 3, pulleys and belt device 4 and final reduction device 5 are provided in a main housing 7 and a side housing 8. A crankshaft 10 of an engine (not shown) is connected to an annular drive member 12 through a drive plate 11 of the electromagnetic powder clutch 1. The electromagnetic powder clutch comprises a driven member 14, and a magnetizing coil 15 provided in the driven member 14. The driven member 14 has its outer periphery spaced from the inner periphery of the drive member 12 by a gap 16, and a powder chamber 17 is defined between the drive member 12 and driven member 14. The powder chamber 17 is filled with magnetic powder. The driven member 14 is secured to an input shaft 13 of the belt-drive transmission. A holder secured to the driven member 14 carries slip rings 18 which are electrically connected to the coil 15. The coil 15 is supplied through brushes 19 and the slip rings 18 with current from a control circuit for the electromagnetic powder clutch.

When the magnetizing coil 15 is excited by clutch current, the driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the belt-drive transmission 2, the selector device 3 is provided between the input shaft 13 and a main shaft 20. The main shaft 20 is cylindrical and is disposed coaxially with the input shaft 13. The selector device 3 comprises a drive gear 21 integral with input shaft 13, reverse driven gear 22 rotatably mounted on the main shaft 20, and a synchronizer 27 mounted on the main shaft 20. The drive gear 21 meshes with one gear of a counter gear assembly 24 rotatably mounted on a shaft 23. Another gear of the counter gear assembly 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of the driven gear 22 through rings 30 or 31.

At a neutral position (N range) of a selector lever (not shown), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide the D range.

When the sleeve 29 is engaged with the gear 22, the input shaft 13 is connected to the main shaft 20 through gears 21, 24, 26 and 22 to provide an R range.

The main shaft 20 has an axial passage in which there is mounted an oil pump driving shaft 42 connected to the crankshaft 10. An output shaft 35 is provided in parallel with the main shaft 20. A drive pulley 36 and a driven pulley 37 are mounted on the shafts 20 and 35. An axially fixed conical disc 36a of the drive pulley 36 is integral with the main shaft 20 and an axially movable conical disc 36b is axially slidably mounted on the main shaft 20. The movable conical disc 36b also slides in a cylinder secured to the main shaft 20 to form a servo device 38. A chamber of the servo device 38 communicates with a gear pump 41 through the pressure oil control circuit. The gear pump 41 is driven by the shaft 42.

A fixed conical disc 37a of the driven pulley 37 is formed on the output shaft 35 opposite the movable disc 36b and a movable conical disc 37b is slidably mounted on the shaft 35 opposite disc 36a. The movable conical disc 37b has a cylindrical portion in which a piston portion of the output shaft 35 is slidably engaged to form a servo device 39. A chamber of the servo device 39 is communicated with the oil pump 41 through the pressure oil control circuit. A spring 40 is provided to urge the movable conical disc 37b to toward the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of driving wheels of the vehicle through a differential 47.

The pressure oil control circuit is responsive to vehicle speed, engine speed and throttle valve position for controlling the pressure oil supply to the servo devices 38 and 39 thereby to move the discs 36b and 37b. Thus, the transmission ratio is infinitely changed. The selector lever is so arranged that it can be further shifted in addition to the D range position to a Ds range. When the Ds range is selected, the pressure oil control circuit is set to provide a special driving transmission ratio which is suitable for active driving of the vehicle.

Referring to FIG. 2 showing a fuel cut off control system, the system is provided with a control unit 50 applied with a plurality of input signals. The input signals are provided by an ignition pulse generator 51 relative to engine speed, vehicle speed pulse generator 52 relative to vehicle speed, accelerator pedal switch 53, range switches 54–56 representing the D range, Ds range, and R range, air conditioner switch 57, and choke valve switch 58. The range switches 54–56 produce output signals when their respective ranges are selected by the selector lever.

The control unit 50 performs a plurality of decision operations as a computer and comprises an engine speed decision section 59 applied with ignition pulses from the ignition pulse generator 51, a vehicle speed decision section 60, and an inverted clutch current decision section 61 applied with signals from the range switches 54–56. A clutch current setting section 62 is applied with output signals from sections 59–61, and switches 53, 57, 58 to set clutch current. Further, output of the clutch current setting section 62 is applied to an output decision section 63 to produce an output for the clutch coil 15.

On the other hand, a fuel cut off decision section 64 is applied with signals from the switches 53, 54, 57, 58 and with signals from decision sections 60 and 61 to produce an output for operating an actuator 65 for cutting off of fuel.

Figure 3A:
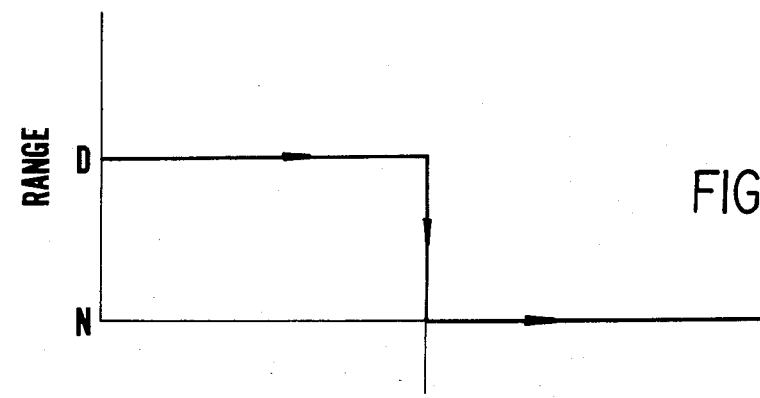
FIGS. 3a to 3c show waveforms illustrating operations of the system of FIG. 2.
Figure 3B:
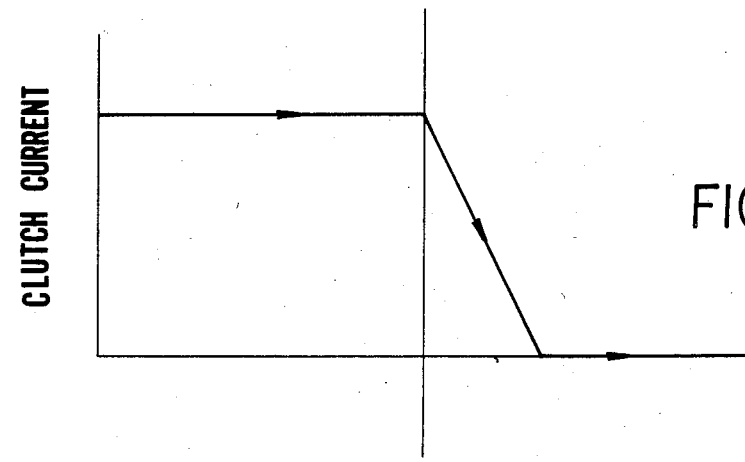

Describing the operation of the system with reference to FIGS. 2 and 3, when the vehicle speed is higher than a predetermined value under the condition of the releasing of the accelerator pedal at the D range, the fuel cut off decision section 64 produces an output in response to input signals from the accelerator pedal switch 53, the D range switch 54 and the vehicle speed decision section 60 to actuate the actuator 65. Thus, the fuel is cut off during the coasting at high speed. At that time, the output decision section 63 produces an output, so that clutch current flows as shown in FIG. 3b to engage the clutch. Accordingly, the engine is driven by the wheels of the vehicle through the transmission system and the clutch.

Figure 3C:
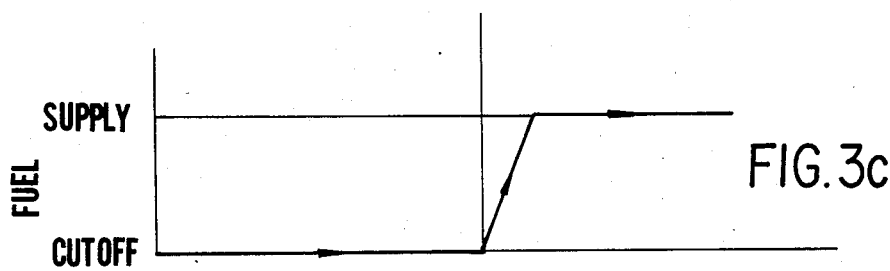

When the selector lever is shifted to the neutral position (N range) as shown in FIG. 3a, the fuel cut off decision section 64 stops producing the output in response to disappearance of the signal from the D range switch 54. Accordingly, the actuator 65 operates to supply fuel as shown in FIG. 3c. On the other hand, the clutch current setting section 62 and the output decision section 63 operate to gradually decrease the clutch current as shown in FIG. 3b. Thus, disengagement of the clutch is delayed. During the partial engagement of the clutch, a comparatively large inertial mass of driven members comprising the driven member 14, input shaft 13, gears 21, 24, 26 and 22 is applied to the crankshaft 10 of the engine to keep the rotation energy thereof. Since the fuel is supplied under such a partial engagement clutch condition, the engine is reliably started.

From the foregoing, it will be understood that the present invention provides a control system for an infinitely variable transmission in which the disengagement of the clutch is delayed when the N range is selected under the condition of a vehicle speed higher than a predetermined value during the D range, thereby preventing stalling of the engine.

What is claimed is:

1. A system for controlling an infinitely variable transmission for an engine mounted on a vehicle comprising:
   an electromagnetic clutch for connecting a crankshaft of the engine with an input shaft of the transmission;
   first means for sensing vehicle speed and for producing a signal when the vehicle speed exceeds a predetermined value;
   second means for detecting the neutral state of the transmission;
   third means for detecting the forward drive state of the transmission;
   fourth means for detecting a released position of an accelerator pedal of the vehicle;
   fifth means for cutting off fuel under conditions of existence of output signals of the first means, third means and fourth means; and
   sixth means for disengaging the electromagnetic clutch with a delay in response to an output signal of the second means under the condition of fuel cut off.

2. The system for controlling an infinitely variable transmission according to claim 1 wherein the fifth means and sixth means comprise a computer.

3. The system according to claim 1, wherein said sixth means gradually, partially disengages said clutch such that said clutch is disengaged after said delay.

4. The system according to claim 1, wherein said fifth means starts to supply the fuel in response to said output signal of the second means under said condition of fuel cut off.

5. The system according to claim 4, wherein said fifth means provides full fuel supply before said clutch is disengaged.

* * * * *